(12) United States Patent
Gallant et al.

(10) Patent No.: US 6,535,991 B1
(45) Date of Patent: Mar. 18, 2003

(54) METHOD AND APPARATUS FOR PROVIDING RELIABLE COMMUNICATIONS IN AN INTELLIGENT NETWORK

(75) Inventors: John K. Gallant, Plano, TX (US); Kathleen A. McMurry, Richardson, TX (US); Terry A. Caterisano, Allen, TX (US); Robert H. Barnhouse, Plano, TX (US); Steven R. Donovan, Plano, TX (US)

(73) Assignee: WorldCom, Inc.

( * ) Notice: Subject to any disclaimer, the term of this patent is extended or adjusted under 35 U.S.C. 154(b) by 0 days.

(21) Appl. No.: 09/481,910

(22) Filed: Jan. 12, 2000

(51) Int. Cl.[7] ................................................ H02H 3/05
(52) U.S. Cl. ......................... 714/4; 709/224; 370/552
(58) Field of Search ........................... 714/4, 1, 10, 11; 370/401, 552; 379/219, 230; 702/203; 709/224

(56) References Cited

U.S. PATENT DOCUMENTS

| | | | |
|---|---|---|---|
| 5,473,679 A | 12/1995 | La Porta et al. | |
| 5,590,161 A | * 12/1996 | Meyn et al. | 375/368 |
| 5,819,019 A | 10/1998 | Nelson | |
| 5,825,780 A | 10/1998 | Christie | |
| 5,946,323 A | 8/1999 | Eakins et al. | |
| 5,958,016 A | * 9/1999 | Chang et al. | 709/229 |
| 5,991,892 A | 11/1999 | Honda | |
| 5,996,001 A | 11/1999 | Quarles et al. | |
| 6,009,099 A | 12/1999 | Lewis et al. | |
| 6,134,673 A | 10/2000 | Chrabaszez | |
| 6,154,849 A | * 11/2000 | Xia | 714/4 |
| 6,169,735 B1 | 1/2001 | Allen, Jr. et al. | |
| 6,173,411 B1 | * 1/2001 | Hirst et al. | 714/4 |
| 6,185,219 B1 | 2/2001 | Christie | |
| 6,195,714 B1 | 2/2001 | Li et al. | |

* cited by examiner

Primary Examiner—Robert Beausoliel
Assistant Examiner—Rita A. Ziemer (57) ABSTRACT

A network device receives signals transmitted via a network and generates trigger messages. The network device transmits the trigger messages to an intelligent network platform that performs a network control function. The network device and the intelligent network platform both include redundant systems to provide increased reliability and rerouting capabilities in case one or more of the components experiences problems or a failure.

28 Claims, 6 Drawing Sheets

METHOD AND APPARATUS FOR PROVIDING RELIABLE COMMUNICATIONS IN AN INTELLIGENT NETWORK

FIELD OF THE INVENTION

The present invention relates to telecommunication networks and, more particularly, to providing reliable communications in an intelligent network.

BACKGROUND OF THE INVENTION

Most conventional telecommunications networks include a number of interconnected switches and routers. These resources typically include processors that perform switching functions, call control functions and various other intelligent functions under the control of proprietary software. This means that when a network owner wishes to implement a new feature or modify an existing service, the software of each switch and router in the network may require changes to support the new/modified feature. With the ever-increasing demand for new features and services, making changes to various vendor equipment platforms each time a new feature is added becomes impractical.

Therefore, network owners have begun offering new intelligent features and services that operate under the control of dedicated network devices. As such, the network resources, such as switches and routers, often require no change when a new feature is added to the data network. One drawback with conventional intelligent data networks, however, occurs when the dedicated device performing the intelligent, value-added processing experiences problems. In this situation, while the device experiencing problems is being serviced, the network may be unavailable. This results in increased network downtime. Another drawback with conventional data networks implementing intelligent features is that there is no rerouting capability when a problem does occur in the network device.

SUMMARY OF THE INVENTION

There exists a need for a system and method for implementing an intelligent network while maintaining the network's reliability.

This and other needs are met by the present invention, where data is transmitted from a network device to an intelligent network platform. The network device and the network platform both include redundant systems to provide increased reliability and rerouting capabilities.

According to one aspect of the invention, a method for communicating with a network application platform is provided in a signal intercept device comprising at least a primary signal intercept processor (SIP) and a secondary SIP. The primary and secondary SIPs are each configured to communicate with a network resource and the network application platform where the network application platform includes two processing systems. The method includes designating a first one of the two processing systems as a preferred processing system and a second one of the two processing systems as an alternate processing system. The method also includes transmitting a message from the primary SIP to the preferred processing system and determining whether a response from the preferred processing system is received. The method further includes redesignating the alternate processing system as the preferred processing system when the response is not received by the primary SIP in a predetermined period of time.

Another aspect of the present invention provides a system for communicating in a network. The system comprises a network application platform that includes a preferred processing system and an alternate processing system. The system also includes a signal intercept platform having a primary signal intercept processor (SIP) system and a secondary SIP system, where the first and second SIP systems are each configured to communicate with a network resource. The primary SIP system is further configured to transmit a message to the preferred processing system, determine whether a response from the preferred processing system is received and redesignate the alternate processing system as the preferred processing system when the response is not received in a predetermined period of time.

Other features and advantages of the present invention will become readily apparent to those skilled in this art from the following detailed description. The embodiments shown and described provide illustration of the best mode contemplated for carrying out the invention. The invention is capable of modifications in various obvious respects, all without departing from the invention. Accordingly, the drawings are to be regarded as illustrative in nature, and not as restrictive.

BRIEF DESCRIPTION OF THE DRAWINGS

Reference is made to the attached drawings, wherein elements having the same reference number designation represent like elements throughout.

DETAILED DESCRIPTION

The present invention will be described with the example of a signal intercept platform communicating with an intelligent network platform. In the exemplary embodiment, the signal intercept platform communicates with a network switch operating in an asynchronous transfer mode (ATM) network. A brief description will first be given of the system architecture and operations, followed by a detailed description of the signaling between the signal intercept platform and the intelligent network platform. It will become apparent, however, that the present invention is also applicable to other types of networks, as described in detail below, as well as to other types of systems in general.

System Overview

Figure 1:
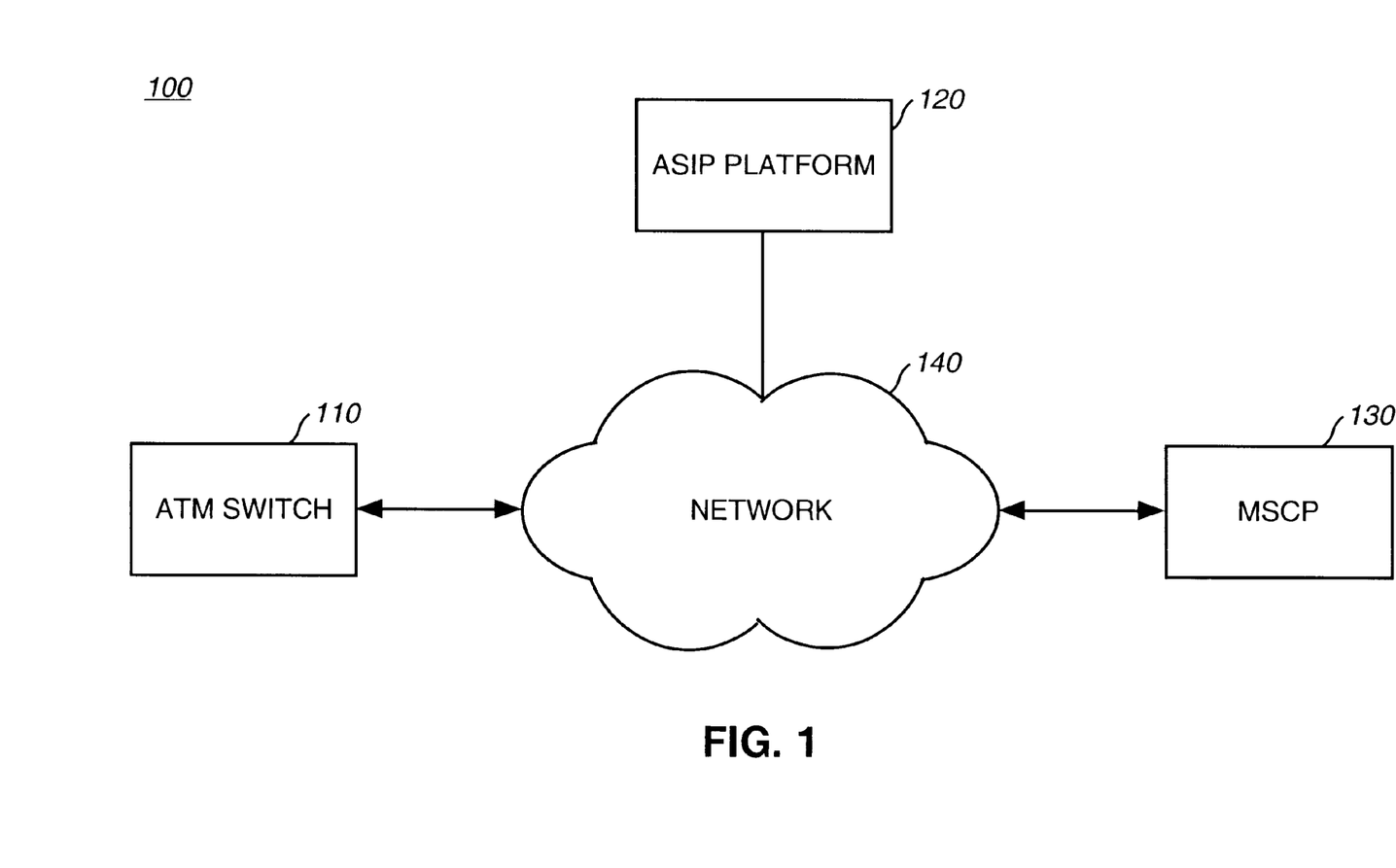
FIG. 1 is an exemplary diagram of an intelligent network system consistent with the present invention.

FIG. 1 is an exemplary system 100 in which methods and systems consistent with the present invention may be implemented. The system 100 includes ATM switch 110, ATM signal intercept processor (ASIP) platform 120 and multi-service control point (MSCP) 130 connected to network 140. Only one ATM switch 110 is shown for simplicity. It should be understood, however, that additional ATM switches 110 may be included in system 100.

ATM switch 110 communicates with ASIP platform 120 over network 140 via a wired or wireless connection. ATM switch 110 consistent with the present invention may include any type of conventional ATM switch. According to an exemplary implementation of the invention, ATM switch 110 communicates with ASIP platform 120 using conventional user network interface (UNI) messaging over network 140, such as the conventional Q.2931 messaging protocol. However, other messaging protocols may also be used for communicating between ATM switch 110 and ASIP platform 120, such as the Q.2933 messaging protocol.

ASIP platform 120 intercepts and processes UNI signaling messages generated by ATM end devices, such as ATM switch 110, and triggers intelligent application processing when specific signaling events occur. ASIP platform 120, as described in more detail below, communicates with MSCP 130 over network 140.

MSCP 130 includes an intelligent network platform, as described in more detail below, for performing intelligent processing functions. ASIP platform 120 and MSCP 130, consistent with the present invention, may communicate with each other over network 140 via a wired or wireless connection. The network 140 may include the Internet, a LAN, WAN, intranet or another type of network.

Figure 2:
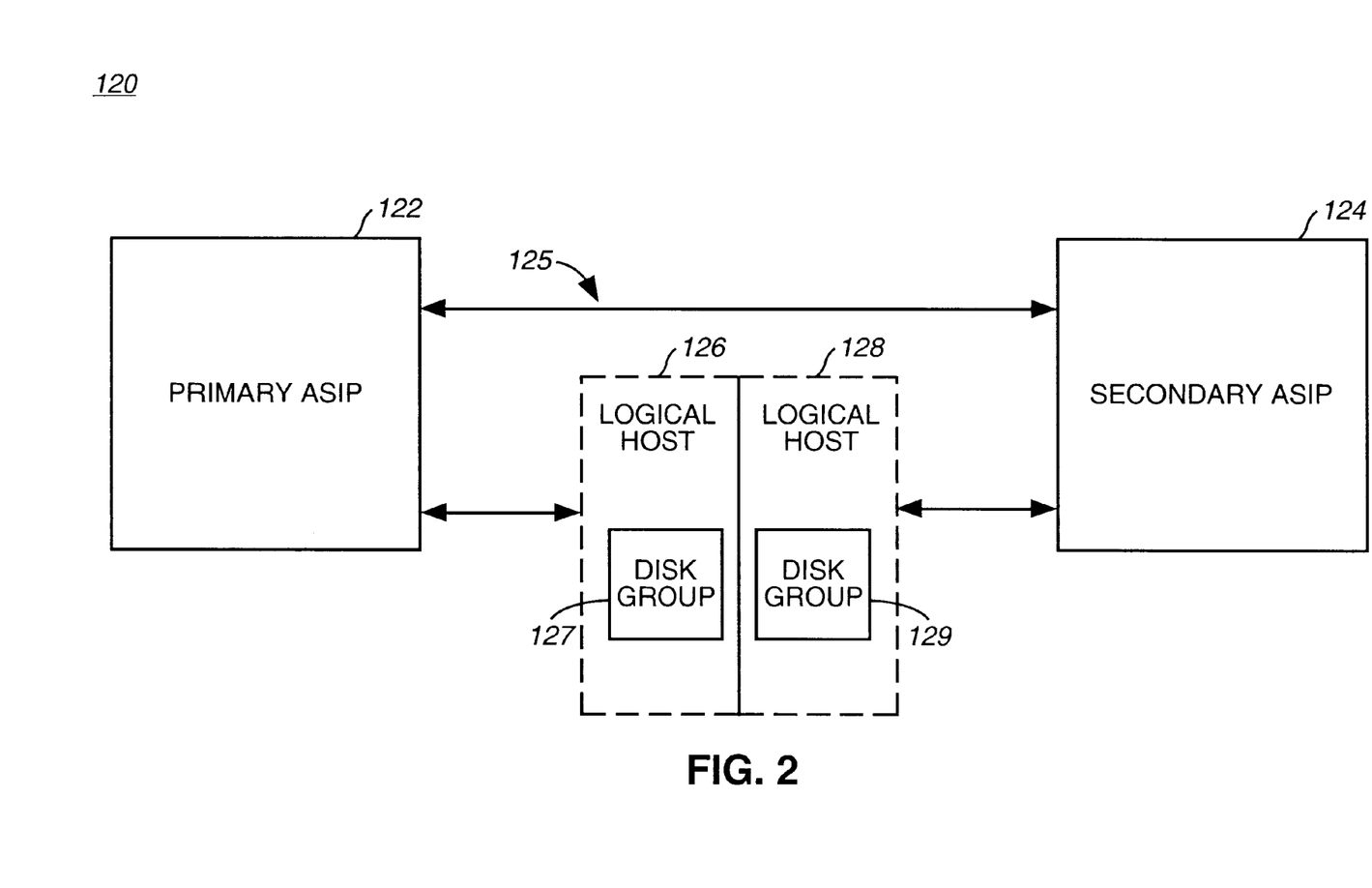
FIG. 2 is an exemplary diagram of the ASIP platform 120 of FIG. 1 consistent with the present invention.

FIG. 2 is an exemplary diagram of ASIP platform 120 of FIG. 1. The ASIP platform 120, consistent with the present invention, includes a primary ASIP 122 and a secondary ASIP 124. The two ASIPs, 122 and 124, operate in a primary and a "hot standby" configuration. More specifically, the primary ASIP 122 performs the processing during normal operating conditions while the secondary ASIP 124 is powered-up and ready to assume the tasks of the primary ASIP 122 in case of a problem. Software residing on the ASIP platform 120 provides for an automatic switch-over in the event of hardware or system software failure and also supports operator-initiated switch-over from the primary ASIP to the hot standby ASIP, as described in more detail below.

Each respective ASIP, 122 and 124, includes a communications interface to an ATM switch port for intercepting user signaling transmitted via ATM network devices, such as ATM switch 110 (FIG. 1). Each respective ASIP also includes interfaces for communicating with MSCP 130 and an operator. Each ASIP also communicates with its corresponding backup ASIP via bus 125.

According to an exemplary implementation of the invention, software residing on the ASIP platform 120 configures logical hosts 126 and 128 (FIG. 2) to facilitate the switch-over process. A logical host consists of one or more disk groups and pairs of logical host names and Internet Protocol (IP) addresses. For example, logical host 126 includes disk group 127 and may be configured as logical host "A" under normal operating conditions. In this scenario, ASIP 122 masters logical host A, has exclusive ownership of disk group 127 and runs the data services on that logical host. Clients connecting to ASIP platform 120 using the logical host name and address associated with logical host 126 actually connect to primary ASIP 122. Similarly, logical host 128 includes disk group 129 and may be configured as logical host "B". In this scenario, ASIP 124 masters logical host B, has exclusive ownership of disk group 129 and runs the data services on that logical host. The disk groups 127 and 129, consistent with the present invention, may include a conventional redundant array of inexpensive disks (RAID) system.

When a switchover occurs, the logical host of the failed node automatically migrates to the backup node and the backup node restarts the data service applications. In this manner, network clients have an access path to all disk groups on the ASIP platform 120 through an independent node that has assumed the logical identify of the failed node.

For example, suppose software on ASIP platform 120 detects a failure in primary ASIP 122. The secondary ASIP 124 receives the failure indication via bus 125 and then reserves the disk groups for all logical hosts currently mastered by primary ASIP 122, i.e., disk group 127. Secondary ASIP 124 then performs a file system check on all file systems in this disk group and assumes control of this disk group. Secondary ASIP 124 then starts the data services on the logical host and begins crash recovery procedures. Finally, secondary ASIP 124 assumes the logical host's 126 network addresses and starts data service fault monitoring as data services are brought back online. In this manner, the reliability of the ASIP platform 120 is increased by rerouting the data processing functions of a failed system to a backup system. Additionally, the rerouting function is transparent to the ATM end device, such as ATM switch 110.

Figure 3:
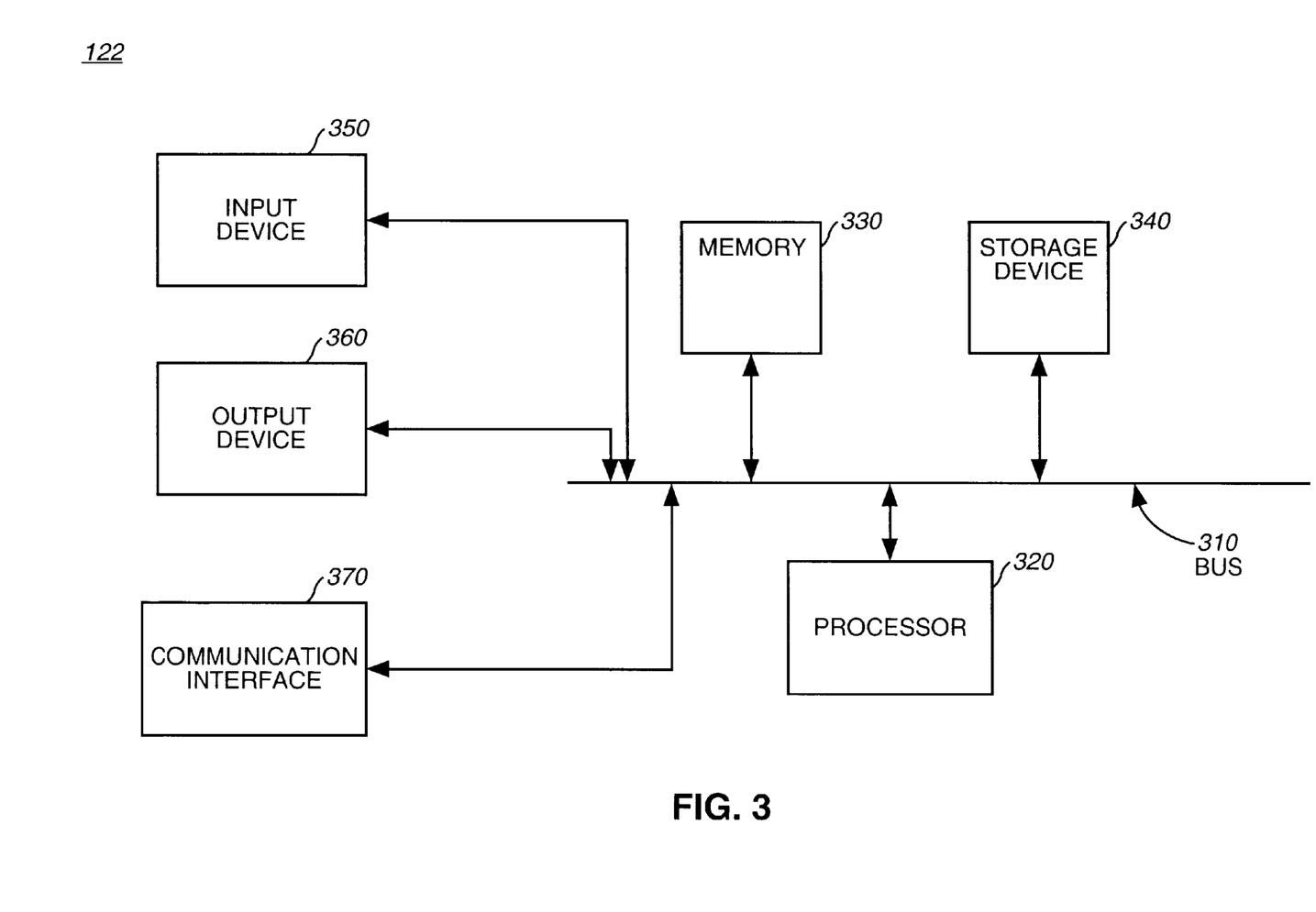
FIG. 3 is an exemplary diagram of the primary ASIP 122 of FIG. 2.

FIG. 3 is an exemplary diagram of the primary ASIP 122 of FIG. 2. The primary ASIP 122 includes a bus 310, a processor 320, a memory 330, a storage device 340, an input device 350, an output device 360, and a communication interface 370. The bus 310 permits communication among the components of the ASIP 122.

The processor 320 may include any type of conventional processor or microprocessor that interprets and executes instructions. The memory 330 may include a RAM or another dynamic storage device that stores information and instructions for execution by the processor 320 and/or a ROM or another type of static storage device that stores static information and instructions for use by the processor 320. The storage device 340 may include a magnetic disk or optical disk and its corresponding drive and/or some other type of magnetic or optical recording medium and its corresponding drive. For example, the storage device 340 may include a RAID system on which disk group 127 may reside.

The input device 350 may include any conventional mechanism that permits an operator to input information to the primary ASIP 122, such as a keyboard, a mouse, a pen, voice recognition and/or biometric mechanisms, etc. The output device 360 may include any conventional mechanism that outputs information to the operator, including a display, a printer, a pair of speakers, etc. The communication interface 370 may include any transceiver-like mechanism that enables the ASIP 122 to communicate with other devices and/or systems. For example, the communication interface 370 may include mechanisms such as a conventional ATM network interface card (NIC) for communicating with an ATM switch 110 via a network, such as network 140 (FIG. 1). The communication interface 370 may also include mechanisms for communicating with MSCP 130 and other network resources.

Execution of the sequences of instructions contained in memory 330 causes processor 320 to perform the process steps that will be described hereafter. In alternative embodiments, hard-wired circuitry may be used in place of or in combination with software instructions to implement the present invention. Thus, the present invention is not limited to any specific combination of hardware circuitry and software.

Returning to FIG. 1, the ASIP platform 120 receives UNI signaling messages generated by ATM end devices, such as ATM switch 110, via network 140. According to an exemplary implementation, the ASIP platform 120 processes the UNI signaling messages and triggers intelligent network application processing when specific signaling events occur, as described in more detail below.

For example, according to an exemplary implementation consistent with the present invention, the ATM platform 120 intercepts all network side and user side Q.2931 protocol primitives, i.e., messages. The processor 320 processes the Q.2931 messages and generates trigger messages for transmission to the MSCP 130 when specific signaling events are detected. For example, the processor 320 may generate a trigger message when various call establishment messages, such as call setup or connect messages are detected. In alternative implementations, processor 320 in ASIP 122 may be programmed to generate trigger messages for transmission to the MSCP 130 for any particular UNI signaling message generated by an ATM end device, based on the particular network requirements.

Secondary ASIP 124 may include similar elements as primary ASIP 122 (FIG. 3) and may be programmed in a similar manner. The redundant architecture, as described previously, ensures that no single component failure will cause an interruption in the ASIP platform's 120 operations. As described in more detail below, the redundant ASIP platform 120 architecture operates with MSCP 130 to further ensure the overall reliability of the system 100.

Figure 4:
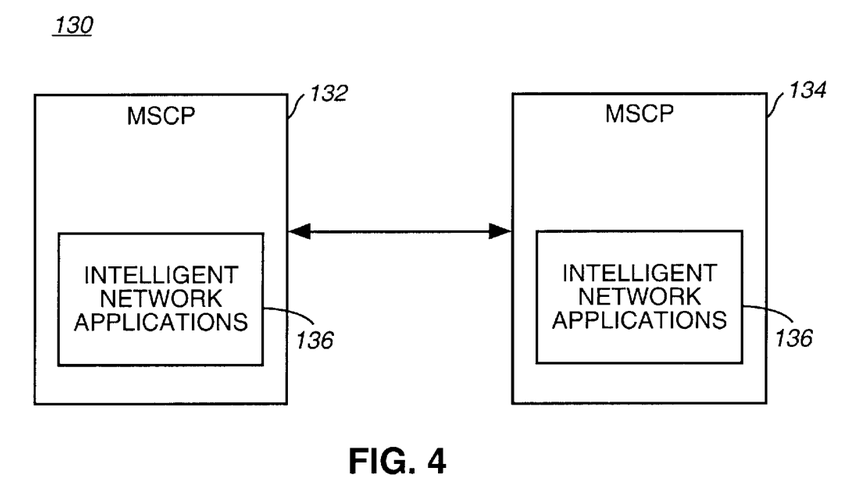
FIG. 4 is an exemplary diagram of MSCP 130 of FIG. 1 consistent with the present invention.

FIG. 4 is an exemplary diagram of the MSCP 130 consistent with the present invention. In an exemplary implementation, MSCP 130 includes redundant MSCP systems 132 and 134. Each MSCP 132 and 134 includes an interface for communicating with both ASIP 122 and ASIP 124. The respective MSCP systems 132 and 134 also include intelligent network applications 136, as described in more detail below, that enable the respective MSCPs to provide value-added features to end users.

For example, the intelligent network applications 136 may include a source address screening (SAS) feature, which permits a user to define addresses from which calls can be received. Such a screening application may include a set of address ranges from which the SAS subscriber may receive a call. The intelligent network applications 136 may also include a destination address screening (DAS) feature, which allows a user to define the addresses to which calls can be made. The intelligent network applications 136 may further include a customer port maximum aggregate bandwidth limit feature which provides a mechanism to limit the aggregate bandwidth handled through an individual customer logical port (CLP). Other intelligent features may be provided in the intelligent network applications 136, based on the particular end user requirements.

For each of the intelligent features provided by intelligent network applications 136, the MSCP 130 performs the value-added processing in response to a trigger message received from ASIP platform 120. More specifically, the MSCPs 132 and 134 receive trigger messages from ASIP platform 120 and process the received data according to the intelligent network applications 136 implemented in the MSCP 130. The trigger message, consistent with the present invention, may include a call identifier, remote port identifier, message direction and a data message. In accordance with an exemplary implementation in which the UNI messaging transmitted via ATM switch 110 utilize a Q.2931 messaging protocol, the data message transmitted as part of the trigger may include Q.2931 message information elements (IEs).

When a new call processing feature or service is added to the intelligent network applications 136, the ASIP platform 120 provides a trigger message to the MSCP 130 and the MSCP 130 processes the data to perform the new intelligent function. Advantageously, no changes to various ATM switches 110 are required when new features are added.

Figure 5:
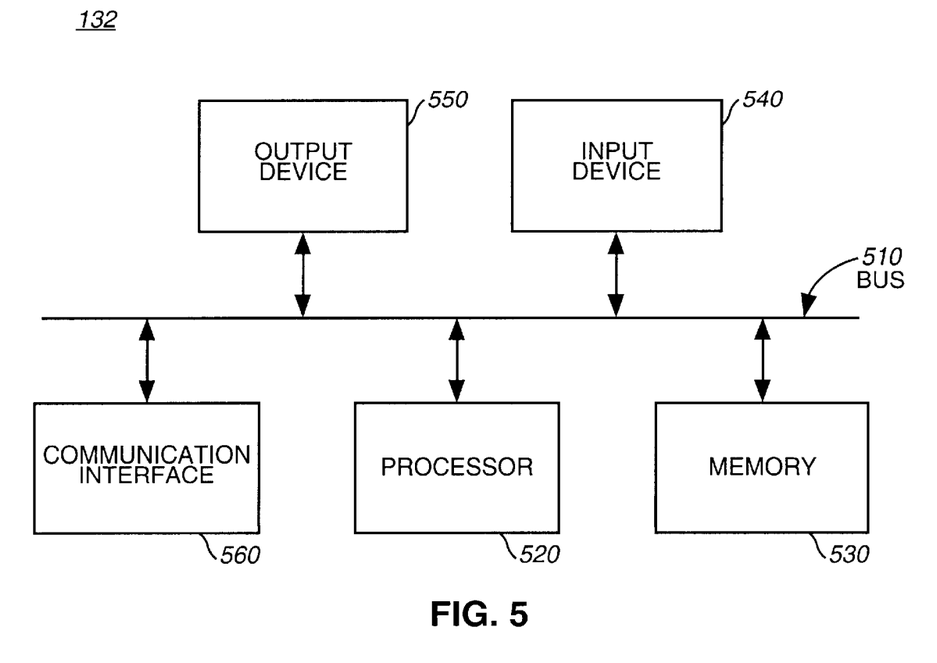
FIG. 5 is an exemplary diagram of MSCP 132 of FIG. 4 consistent with the present invention.

FIG. 5 is an exemplary diagram of MSCP 132 of FIG. 4. The MSCP 132 includes a bus 510, a processor 520, a memory 530, an input device 540, an output device 550, and a communication interface 560. The bus 510 permits communication among the components of the MSCP 132.

The processor 520 may include any type of conventional processor or microprocessor that interprets and executes instructions. The memory 530 may include a RAM or another dynamic storage device that stores information and instructions for execution by the processor 520; a ROM or another type of static storage device that stores static information and instructions for use by the processor 520; and/or some other type of magnetic or optical recording medium and its corresponding drive.

The input device 540 may include any conventional mechanism that permits an operator to input information to the MSCP 132, such as a keyboard, a mouse, a pen, voice recognition and/or biometric mechanisms, etc. The output device 550 may include any conventional mechanism that outputs information to the operator, including a display, a printer, a pair of speakers, etc. The communication interface 560 may include any transceiver-like mechanism that enables the MSCP 132 to communicate with other devices and/or systems. For example, the communication interface 560 may include mechanisms for communicating with ASIP platform 120 via a network, such as network 140 (FIG. 1).

Execution of the sequences of instructions contained in memory 530 causes processor 520 to respond to the ASIP platform 120 trigger messages, perform the intelligent functions and transmit information back to the ASIP platform 120, as described in more detail hereafter. In alternative embodiments, hard-wired circuitry may be used in place of or in combination with software instructions to implement the present invention. Thus, the present invention is not limited to any specific combination of hardware circuitry and software.

MSCP 134 may include similar elements as MSCP 132 (FIG. 5) and may be programmed in a similar manner. The redundant architecture of the MSCP 130 ensures that no single component failure will cause an interruption in MSCP 130 operations. As described in more detail below, the redundant ASIP platform 120 architecture operates with the redundant MSCP 130 architecture to further ensure the overall reliability of the system 100.

Exemplary Processing for Communicating Between the ASIP Platform and the MSCP

Processing consistent with the present invention enables the intelligent network to perform various intelligent processing functions while maintaining high reliability. According to the exemplary implementation described above, both the ASIP platform 120 and MSCP 130 utilize redundant architectures for increasing the reliability of system 100.

The ASIP platform 120, consistent with the present invention, may communicate with the MSCP 130 over Internet protocol version four (IPv4) using user datagram protocol (UDP) and a data network application protocol (DNAP), similar to the conventional intelligent network application protocol (INAP). Transmitting data in this manner enables the ASIP platform 120 and MSCP 130 to communicate in a high-speed, efficient manner, thereby saving time associated with transmitting the data to the end destinations.

Figure 6:
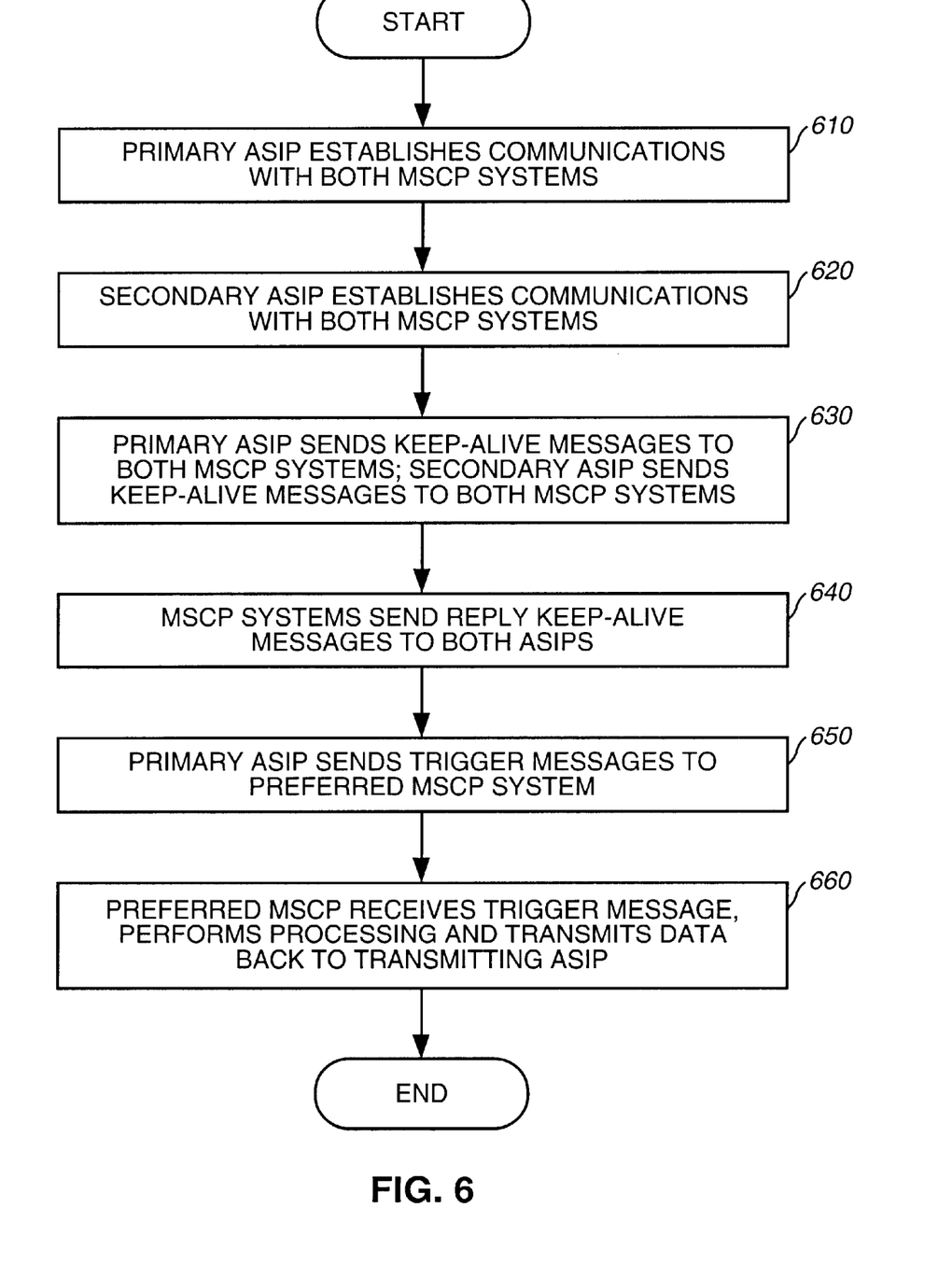
FIG. 6 is an exemplary flow diagram illustrating processing for communicating between ASIP platform 120 and MSCP 130 when all network components are functioning properly.

FIG. 6 is an exemplary flow diagram, consistent with the present invention, illustrating processing associated with signaling between the ASIP platform 120 and MSCP 130. Assume that the primary ASIP is ASIP 122 and the secondary ASIP is ASIP 124 (FIG. 2). At step 610, the primary ASIP 122 establishes communications with both MSCP systems 132 and 134. ASIP 122 may establish communications with MSCPs 132 and 134 in any conventional manner over network 140. At step 620, the secondary ASIP 124 establishes communications with MSCP systems 132 and 134 in a similar manner. In alternative implementations, the secondary ASIP 124 may establish communications with the MSCPs 132 and 134 either concurrently with the primary ASIP 122 or at a later time.

The primary ASIP 122 at step 630 sends periodic "keep-alive" messages to MSCP 132 and MSCP 134. Similarly, the secondary ASIP 124 sends periodic keep-alive messages to MSCP systems 132 and 134. These keep-alive messages are transmitted from ASIPs 122 and 124, respectively, to determine whether their respective links to MSCPs 132 and 134 are functioning properly. The keep-alive messages may be sent to the MSCPs at any predetermined frequency, based on the particular system requirements. Additionally, the keep-alive message may include any particular message transmitted from the respective ASIP to the MSCPs for the purpose of determining whether the link is functioning properly. The details of the programming required to transmit such keep-alive messages are not disclosed herein as such programming steps can be determined by one of ordinary skill in the art from the functions described herein.

Each MSCP, 132 and 134, at step 640 transmits reply keep-alive messages to each respective ASIP 122 and 124. In an implementation consistent with the present invention, the MSCPs send these messages to the IP address of the ASIP that transmitted the original keep-alive message. In this manner, when the respective ASIP receives the reply keep-alive message, the ASIP knows that the link between that ASIP and the particular MSCP is operating properly.

For example, when ASIP 122 receives a reply keep-alive message from MSCP 132 and MSCP 134, ASIP 122 determines that the link to MSCP 132 and the link to MSCP 134 are both operating properly. The keep-alive messages may be periodically transmitted back and forth between the ASIPs and MSCPs in this manner while the system 100 is operating.

Additionally, MSCPs 132 and 134 also transmit periodic keep-alive messages to ASIPs 122 and 124 in a similar manner. ASIPs 122 and 124 receive these keep-alive messages and transmit reply keep-alive messages to the respective MSCPs.

Next, assume that the primary ASIP 122 receives a particular message that requires intelligent network processing. As described previously, the ASIP platform 120 generates a trigger message to MSCP 130 when such a message is detected. In an exemplary implementation consistent with the present invention, the primary ASIP 122 sends a trigger message to the preferred MSCP system at step 650. That is, the ASIP 122 send a trigger message to only one of the two MSCP systems. The selection of the preferred MSCP system may be programmed or selected via an operator interface to ASIP 120. Assume that MSCP 132 is pre-programmed as the preferred system. In this case, ASIP 122 transmits the trigger message to MSCP 132.

MSCP 132 receives the trigger message at step 660, processes the data transmitted via ASIP 122, performs the particular intelligent functions specified by intelligent network applications 136 (FIG. 4) and transmits information back to the primary ASIP 122.

The scenario described in relation to FIG. 6 assumes that all components and links between ASIP platform 120 and MSCP 130 are functioning properly. In situations where there may be a problem with one or more of the components of ASIP platform 120, MSCP 130 or the links between the ASIP platform 120 and MSCP 130, the present invention enables the communications between the ASIP 120 and MSCP 130 to continue.

Figure 7:
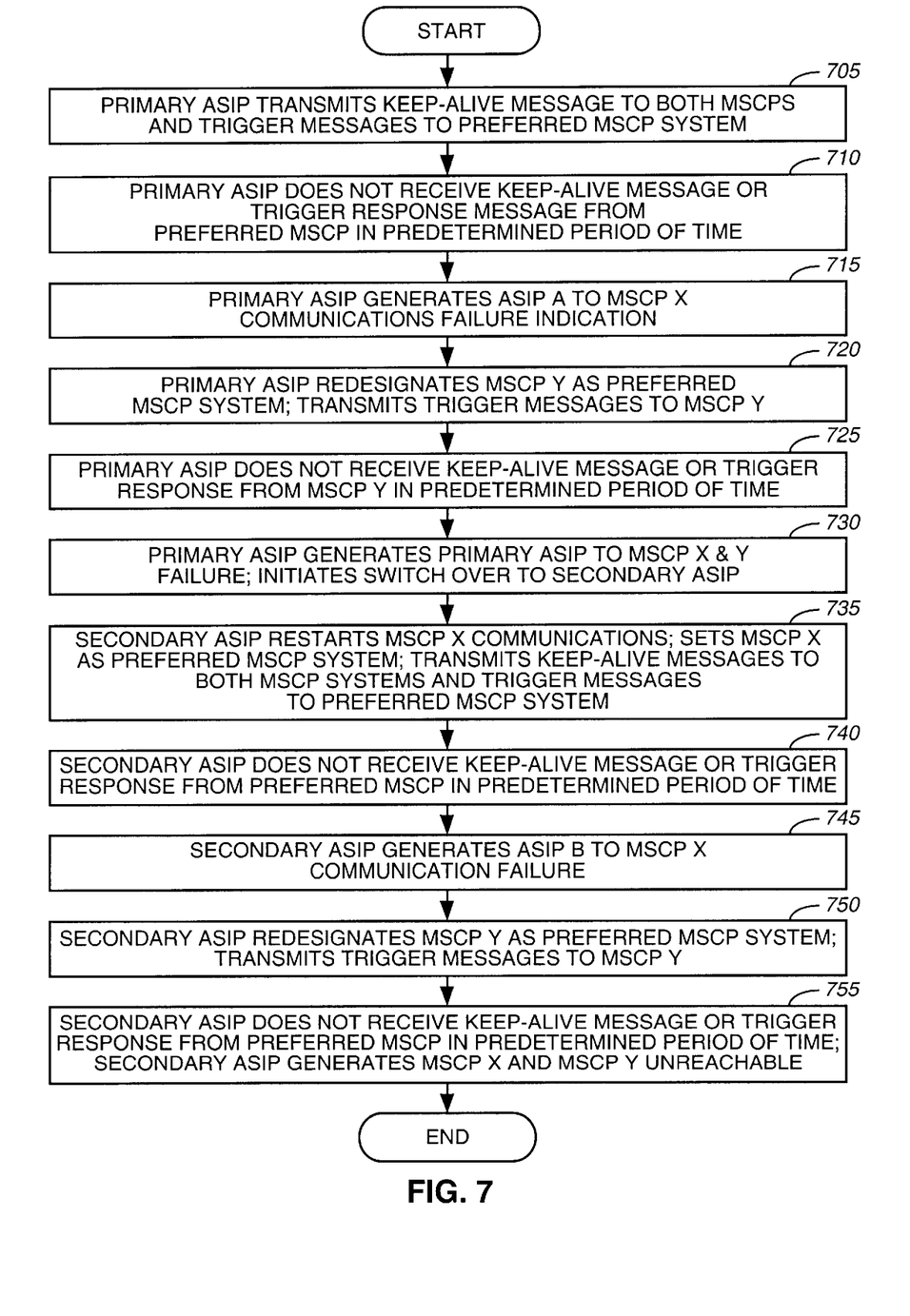
FIG. 7 is an exemplary flow diagram illustrating processing for communicating between ASIP platform 120 and MSCP 130 when one or more network components experience problems.

FIG. 7 is an exemplary flow diagram, consistent with the present invention, illustrating processing associated with signaling between the ASIP 120 and MSCP 130 when one or more of the components experiences problems or a failure. Assume that the primary ASIP is ASIP 122 and the secondary ASIP is ASIP 124 (FIG. 2). Further assume that the preferred MSCP system is MSCP 132 (FIG. 4). In an exemplary implementation consistent with the present invention, ASIPs 122 and 124 have different addresses and similarly, MSCP 132 and MSCP 134 have different addresses. Assume that ASIPs 122 and 124 have addresses "A" and "B," respectively, and MSCPs 132 and 134 have addresses "X" and "Y," respectively.

At step 705, ASIP 122 transmits keep-alive messages to MSCP 132 and 134 at a predetermined frequency. ASIP 122 also transmits trigger messages to MSCP 132 when a signaling message received by ASIP 122 requires processing by MSCP 132. Next at step 710, assume that ASIP 122 does not receive a reply keep-alive message from MSCP 132 in a predetermined period of time or does not receive a response to a trigger message in a predetermined period of time. The predetermined period of time for receiving a keep-alive message may be stored in memory on ASIP 122, for example, in memory 330 (FIG. 3). Similarly, the period for response for receiving a trigger response may be stored in memory on ASIP 122 and may vary depending on the particular data message.

Optionally, ASIP 122 may try to communicate with MSCP 132 a predetermined number of times by retransmitting the keep-alive message and/or the trigger message. If ASIP 122 fails to receive the required response from MSCP 132, ASIP 122 generates an ASIP A to MSCP X communications failure indication at step 715. Next at step 720, ASIP 122 redesignates MSCP 134 as the preferred MSCP system. ASIP 122 then transmits the current and future trigger messages to MSCP 134. Now assume that the ASIP 122 does not receive a keep-alive message or trigger response message from MSCP 134 in a predetermined period of time at step 725. ASIP 122 then determines that a failure in communications between ASIP 122 and MSCP 134 has occurred. ASIP 122 then generates a primary ASIP to MSCP X and Y failure indication at step 730. The ASIP 122 also initiates a switch-over to secondary ASIP 124 by transmitting a switch-over command to ASIP 124 via bus 125 (FIG. 2).

After receiving the switchover command from ASIP 122, ASIP 124 restarts communications with MSCP 132 and sets MSCP 132 as the preferred MSCP system at step 735. ASIP 124 then transmits keep-alive messages to both MSCPs 132 and 134 and any trigger messages to MSCP 132. Next at step 740, assume that ASIP 124 does not receive either a reply keep-alive message or the response to the trigger message from MSCP 132 in a predetermined period of time. Similar to the procedure discussed above for ASIP 122, ASIP 124 may optionally retry to transmit the keep-alive message and/or trigger message to MSCP 132 a predetermined number of times. Assuming that the ASIP 124 does not receive the required response from MSCP 132 in the predetermined period of time, ASIP 124 generates an ASIP B to MSCP X communications failure indication at step 745, where "B" represents the secondary ASIP 124 and X represents the preferred MSCP 132.

Next at step 750, ASIP 124 redesignates MSCP 134 as the preferred MSCP system. ASIP 124 then transmits the current and any future trigger messages to MSCP 134, in addition to the normal keep-alive messages. If ASIP 124 does not receive a response to the keep-alive message or trigger message from MSCP 134 in the predetermined period of time, ASIP 124 may optionally retransmit the keep-alive message and/or trigger message to MSCP 134 a predetermined number of times. Assuming that ASIP 124 does not receive the required response from MSCP 134 in the predetermined period of time, ASIP 124 generates an MSCP X and MSCP Y unreachable indication at step 755. ASIP 122 then returns as the primary ASIP and begins retrying to establish proper communications with MSCP 132 as the preferred MSCP system.

As discussed previously, both MSCPs 132 and 134 also transmit periodic keep-alive messages to ASIP 122 and 124. ASIPs 122 and 124, after receiving the keep-alive message, transmit reply keep-alive messages to the respective MSCPs 132 and 134. If either of the respective MSCPs do not receive the reply message in a predetermined period of time, that MSCP may initiate an alarm message indicating a failure in communications.

In the scenario described above, the ASIPs 122 and 124 interact with MSCPs 132 and 134 to increase the reliability of the intelligent network applications layer. That is, the ASIPs 122 and 124 and MSCPs 132 and 134 utilize their redundant architecture to reroute data when one or more of the components/links experiences problems. In the scenario described above in relation to FIG. 7, the communications from both ASIPs and MSCPs experienced problems. Other scenarios exist when the primary ASIP is communicating properly with the preferred MSCP 132, while the link to the secondary MSCP 134 may experience problems. For example, the primary ASIP 122 may not receive the response to the keep-alive message from MSCP 134 in the predetermined time period. In this scenario, the primary ASIP 122 generates an ASIP A to MSCP Y communications failure indication. However, no rerouting or switch-over occurs. If, in addition, ASIP 124 cannot communicate with MSCP 134, ASIP 122 generates an MSCP Y unreachable indication.

In another scenario, assume that the secondary ASIP 124 fails to receive keep-alive messages from preferred MSCP 132. In this case, secondary ASIP 124 generates an ASIP B to MSCP X communications failure indication.

In still another scenario, assume that the secondary ASIP 124 fails to receive keep-alive messages from alternate MSCP 134. In this case, secondary ASIP 124 generates an ASIP B to MSCP Y communications failure indication.

In each of the scenarios described above, ASIPs 122 and 124 communicate the MSCP link states between themselves via link 125 (FIG. 2). According to an exemplary implementation consistent with the present invention, link 125 is a redundant link to further increase the reliability of the system. If a dual failure occurs where both MSCP links on the primary ASIP fail and the inter-ASIP redundant link 125 fails, the ASIP platform 120 initiates a switch-over to the secondary ASIP and issues the appropriate alarm indications.

Systems and methods consistent with the present invention provide reliable communications in an intelligent data network. An advantage of the invention is that reliability is improved via re-routing capabilities in a redundant architecture. Another advantage of the present invention is that data is transmitted between the ASIP platform 120 and MSCP 130 in a high-speed, efficient manner.

In this disclosure, there is shown and described only the preferred embodiments of the invention, but, as aforementioned, it is to be understood that the invention is capable of use in various other combinations and environments and is capable of changes or modifications within the scope of the inventive concept as expressed herein.

For example, in alternative implementations consistent with the present invention, the functions of ASIP platform 120 and MSCP 130 may be performed by a single platform. Additionally, ASIP platform 120 and MSCP 130 may communicate via mechanisms other than network 140, such as a private network or direct connections. Further, additional redundancy may be added by including more than one backup device in both the ASIP platform 120 and MSCP 130.

Additionally, the present invention has been described with the example of an ASIP platform 120 communicating with MSCP 130 in an ATM network. In alternative implementations consistent with the present invention, the ASIP platform 120 may be any network device, such as a switch or switch-like entity connected to network 140. Further, MSCP 130 may be any intelligent network platform that performs an intelligent control function and network 140 may be any type of network.

What is claimed is:

1. In a signal intercept device comprising at least a primary signal intercept processor (SIP) and a secondary SIP, the primary and secondary SIPs each configured to communicate with a network resource and a network application platform, the network application platform comprising at least two processing systems, a method for communicating with the network application platform, comprising:

designating a first one of the at least two processing systems as a preferred processing system and a second one of the at least two processing systems as an alternate processing system;

transmitting a message from the primary SIP to the preferred processing system;

determining whether a response from the preferred processing system is received;

retransmitting the message from the primary SIP to the preferred processing system when the response is not received in a predetermined period of time; and redesignating the alternate processing system as the preferred processing system when the response is not received by the primary SIP after a predetermined number of retransmissions.

2. The method of claim 1, further comprising;

transmitting a message from the primary SIP to the redesignated alternate processing system;

determining whether a response from the redesignated alternate processing system is received; and switching from the primary SIP to the secondary SIP when the response is not received in a predetermined period of time.

3. The method of claim 2, wherein the switching includes: redesignating the secondary SIP as the primary SIP.

4. The method of claim 1, wherein the transmitting a message includes transmitting a keep-alive message from the primary SIP to the preferred processing system.

5. The method of claim 1, wherein the transmitting a message includes transmitting a trigger message to the primary processing system, the trigger message representing a request for processing by the preferred processing system.

6. The method of claim 1, wherein the transmitting a message includes transmitting a keep-alive message at predetermined intervals and transmitting a trigger message representing a request for processing.

7. The method of claim 1, further comprising:
configuring a plurality of memory devices as a logical group, wherein the primary SIP controls the logical group under normal operating conditions and the secondary SIP controls the logical group when a failure in the communications between the primary SIP and the network application platform is detected.

8. The method of claim 1, wherein the transmitting a message includes: transmitting an Internet protocol message using a user datagram protocol.

9. A system for providing communications in a network, comprising:
a network application platform comprising:
a preferred processing system, and
at least one alternate processing system; and
a signal intercept platform comprising:
a primary signal intercept processor (SIP) system, and
at least one secondary SIP system, the first and secondary SIP systems each configured to communicate with a network resource wherein the primary SIP system is further configured to:
transmit a message to the preferred processing system,
determine whether a response from the preferred processing system is received,
retransmit the message to the preferred processing system when the response is not received in a predetermined period of time, and
redesignate the alternate processing system as the preferred processing system when the response is not received after a predetermined number of retransmissions.

10. The system of claim 9, wherein the primary SIP system is further configured to:
transmit a message from the primary SIP system to the redesignated alternate processing system;
determine whether a response from the redesignated alternate processing system is received; and
transmit a signal to the secondary SIP system when the response is not received in a predetermined period of time.

11. The system of claim 10, wherein the secondary SIP system is configured to designate itself as the primary SIP system when the signal is received.

12. The system of claim 9, wherein the message includes a keep-alive message.

13. The system of claim 9, wherein the message includes a trigger message representing a request for processing by the preferred processing system.

14. The system of claim 9, wherein the message includes at least one of a keep-alive message and a trigger message representing a request for processing.

15. The system of claim 9, wherein the primary SIP system is further configured to control a memory device during normal operating conditions, the memory device storing addresses associated with a logical host, and the secondary SIP system is further configured to control the memory device when a failure in communications between the primary SIP system and the network application platform is detected.

16. The system of claim 9, wherein the primary SIP system is configured to transmit the message over an Internet protocol using a user datagram protocol.

17. In an asynchronous transfer mode (ATM) network interface device comprising a primary ATM signal intercept processor (ASIP) and at least one secondary ASIP, the primary and secondary ASIPs each configured to communicate with a network resource and a network application platform, the network application platform comprising a preferred processing system and at least one alternate processing system, a method for communicating with the network application platform, comprising:
transmitting a message from the primary ASIP to both the preferred and the at least one alternate processing systems;
determining whether a response from the preferred processing system is received;
retransmitting the message to the preferred processing system when the response is not received in a predetermined period of time; and
redesignating the alternate processing system as the preferred processing system when a response is not received by the primary SIP after a predetermined number of retransmissions.

18. The method of claim 17, further comprising;
transmitting a message from the primary ASIP to the redesignated alternate processing system;
determining whether a response from the redesignated alternate processing system is received;
retransmitting the message to the redesignated alternate processing system when the response is not received in a predetermined period of time; and
switching from the primary ASIP to the secondary ASIP when the response is not received after a predetermined number of retransmissions.

19. The method of claim 18, wherein the switching includes:
redesignating the secondary ASIP as the primary ASIP.

20. The method of claim 17, wherein the transmitting a message includes transmitting a keep-alive message at predetermined intervals from the primary ASIP to the preferred processing system, the method further comprising:
transmitting a trigger message representing a request for processing from the primary ASIP to the preferred processing system.

21. The method of claim 17, wherein the transmitting a message includes transmitting an Internet protocol message using a user datagram protocol.

22. A computer-readable medium having stored thereon a plurality of sequences of instructions, said sequences of instructions including sequences of instructions which, when executed by a processor, cause said processor to perform a method comprising:
designating a first one of at least two processing systems in a network application platform as a preferred processing system and a second one of the at least two processing systems as an alternate processing system;

transmitting a message to the preferred processing system;

determining whether a response from the preferred processing system is received;

retransmitting the message to the preferred processing system when the response is not received in a predetermined period of time; and redesignating the alternate processing system as the preferred processing system when the response is not received after a predetermined number of retransmissions.

23. The computer-readable medium of claim 22, causing said processor to perform the further steps of:

transmitting a message to the redesignated alternate processing system;

determining whether a response from the redesignated alternate processing system is received; and transmitting a signal when the response is not received in a predetermined period of time.

24. The computer-readable medium of claim 23, wherein said signal represents a processor to application platform failure, the method further causing said processor to designate itself as a secondary processor when the response from the redesignated alternate processing system is not received in the predetermined period of time.

25. In a telecommunications network supporting intelligent network control functions, a method for communicating between a network device and an intelligent network controller comprising at least two processing systems, the method comprising:

designating a first one of the at least two processing systems as a preferred processing system and a second one of the at least two processing systems as an alternate processing system;

transmitting a trigger message from the network device to the preferred processing system, the trigger message representing a request for an intelligent control function;

performing the intelligent control function in response to the trigger message;

transmitting a response to the trigger message from the preferred processing system to the network device;

determining whether the response from the preferred processing system is received; and redesignating the alternate processing system as the preferred processing system when the response is not received by the network device in a predetermined period of time.

26. The method of claim 25, further comprising;

transmitting the trigger message from the network device to the redesignated alternate processing system, when the response from the preferred processing system is not received in a predetermined period of time; and determining whether a response from the redesignated alternate processing system is received.

27. The method of claim 26 wherein the network device comprises a primary processor and a secondary processor, the method further comprising:

switching from the primary processor to the secondary processor when the response from the redesignated processing system is not received in a predetermined period of time; and transmitting the trigger message from the secondary processor to the preferred processing system.

28. The method of claim 25, further comprising:

transmitting messages between the network device and the intelligent network controller to determine the status of at least one communication link between the network device and the intelligent network controller; and providing an alarm indication when the at least one communication link experiences a failure.

* * * * *